United States Patent
Dennis, Jr.

[15] 3,662,326
[45] May 9, 1972

[54] SUBAUDIBLE FREQUENCY DETECTION SYSTEM
[72] Inventor: Paul S. Dennis, Jr., East Northport, N.Y.
[73] Assignee: Hazeltine Corporation
[22] Filed: Nov. 4, 1969
[21] Appl. No.: 873,867

[52] U.S. Cl. .......................... 340/15, 340/16 R, 340/258 D
[51] Int. Cl. ..................................................... G08b 13/00
[58] Field of Search ................... 340/5, 6, 15, 16, 258 D, 261

[56] References Cited

UNITED STATES PATENTS 3,246,285   4/1966   Kryter .................................. 340/16 X
3,296,587   1/1967   Baker .................................. 340/15 X Primary Examiner—Richard A. Farley
Attorney—Kenneth P. Robinson

[57] ABSTRACT

Disclosed are systems usable in detecting subaudible frequencies. In one embodiment a seismic detector is shown positioned in the earth and responding to the subaudible frequency vibrations caused by a moving person. A subaudible frequency signal is developed in response to the detected vibrations and is translated by modulating and mixer circuitry into an output signal in which each frequency component in the subaudible frequency signal is represented by a single corresponding audio frequency component. The output signal is supplied to a loudspeaker for aurally distinguishing the representative audio frequency components to detect the person. Other embodiments are also covered.

10 Claims, 3 Drawing Figures

3,662,326

SUBAUDIBLE FREQUENCY DETECTION SYSTEM

BACKGROUND OF THE INVENTION

This invention relates to detection systems and more particularly to systems usable in detecting the presence of subaudible frequencies such as those caused by various objects.

Moving objects cause vibrations in the earth, the air and even through water. Instances of such vibrations are those caused by a person walking, a vehicle being driven along a road, or the movement of a ship through the ocean. Vibrations may also be emitted from nonmoving objects such as a stationary vehicle whose motor is idling.

The aforementioned vibrations often include components of many frequencies. Unfortunately, the higher frequency vibrations including those in even the audio frequency range are rapidly attenuated and thus quickly become indistinguishable from other vibration frequencies which are also present, such as those in background noise.

However, the objects also cause lower frequency vibrations and these are attenuated much less rapidly and therefore may be detected by listening devices located even 100 or more yards away. The requisite listening devices can thus be placed at various locations in the vicinity of where the objects may appear and still be able to detect the subaudible frequency vibrations caused by the objects. These detected vibrations, however, are usually in the frequency range of 5 to 100 cycles per second and, although it is recognized that different objects provide distinctive types of vibrations in this low or subaudible frequency range, such vibrations have not heretofore been aurally distinguishable.

SUMMARY OF THE INVENTION

It is therefore an object of the present invention to provide new and improved detection systems; to provide detection systems responsive to subaudible frequency vibrations; and to provide such detection systems usable in aurally distinguishing subaudible frequency vibrations to detect an object causing the vibrations.

In accordance with the present invention there is provided a detection system responsive to subaudible frequency vibrations, including transducer means responsive to subaudible frequency vibrations for developing a subaudible frequency signal corresponding to the vibrations. The system further includes means for modifying the subaudible frequency signal to develop an output signal having audio frequency components representative of the subaudible frequency vibrations and means responsive to the output signal for providing an aural presentation of the output signal wherein the audio frequency components therein representative of the subaudible frequency vibrations caused by an object are aurally distinguishable for permitting detection of the objects.

For a better understanding of the present invention together with other and further objects thereof, reference is had to the following description taken in connection with the accompanying drawings, while its scope will be pointed out in the appended claims.

BRIEF DESCRIPTION OF THE DRAWINGS

FIG. 1a depicts alternative units substitutable for portions of the systems shown in FIGS. 1 and 2 in order to provide still other detection systems in accordance with the invention.

DESCRIPTION OF THE INVENTION

Figure 1:
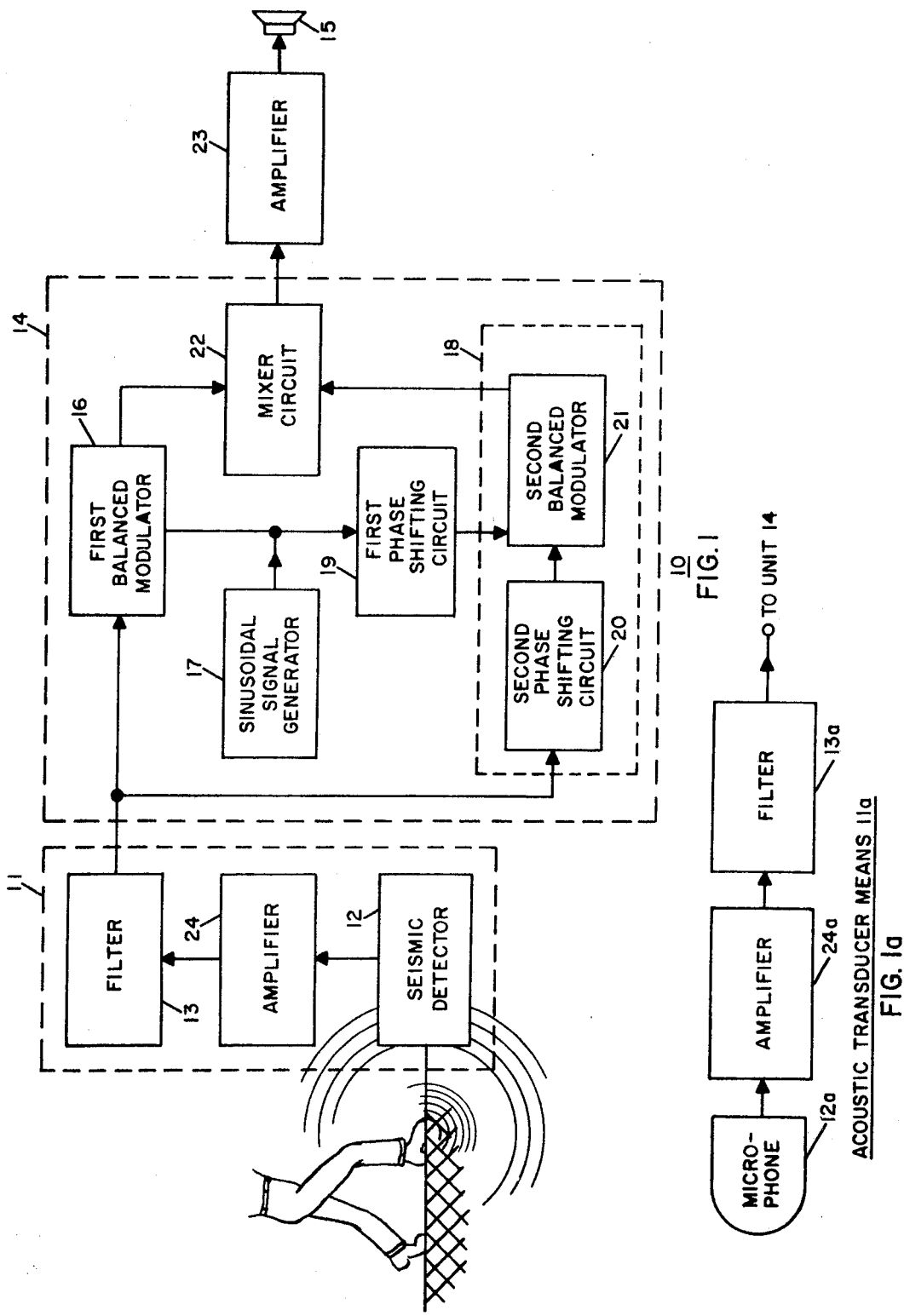
FIG. 1 is a block diagram of one form of detection system in accordance with the invention and in which the system is shown for use in detecting a moving person.

Description and Operation of the Circuit of FIG. 1

In FIG. 1 there is shown a detection system 10, one form of system in accordance with the invention which is responsive to subaudible frequency vibrations caused by an object to be detected. System 10 includes transducer means, depicted as seismic transducer means 11, responsive to subaudible frequency vibrations in the earth caused by a moving person and includes a seismic detector 12 positioned to be responsive to these vibrations for developing a detection signal which corresponds to the detected vibrations. Although the vibrations referred to are in the earth and are shown caused by a moving person it will be recognized that applicant's system is operable regardless of the particular manner in which the subaudible frequency vibrations are caused or propagated, provided only that system 10 is responsive to these vibrations. For example, the vibrations may be caused by other types of objects, in different ways, and even propagate through different media such as air or water.

Also included in seismic transducer means 11 of FIG. 1 is a low pass filter 13 responsive to the detection signal for filtering out substantially all except the subaudible frequency portion of the detection signal to provide the subaudible frequency signal. In instances where the detection signal essentially contains only subaudible frequency components, low pass filter 13 is unnecessary in which event the detection signal is the subaudible frequency signal itself.

Further included in detection system 10 is means 14 for modifying the subaudible frequency signal to develop an output signal having audio frequency components representative of the subaudible frequency vibrations, and means shown as loudspeaker 15, responsive to the output signal, for providing an aural presentation of the output signal wherein the audio frequency components therein representative of the subaudible frequency vibrations caused by the moving person, are aurally distinguishable, thereby permitting detection of the person.

The aforementioned modifying means 14 in FIG. 1 comprises several units and at its output provides the aforementioned output signal which has a single set of audio frequency components, each frequency component in the subaudible frequency signal being represented by a corresponding single audio frequency in this set. Also included in modifying means 14 is first means, balanced modulator 16, which is supplied with two input signals: the output from signal generator 17 and the subaudible frequency signal from the output of low pass filter 13. First blanced modulator 16 develops a first modulated signal at its output. This signal has a first set of frequency components corresponding to the sum of the subaudible frequency signal and the first reference signal frequency and a second set corresponding to the difference therebetween.

Modifying means 14 additionally includes second modulator means 18, shown as units 20 and 21, which is supplied the subaudible frequency signal from the output of low pass filter 13 and also a second audio frequency reference signal, the reference signal developed by signal generator 17 phase-shifted by an angle $\phi$ of approximately 90° by a first phase-shifting circuit 19. The aforementioned unit 20, a second phase-shifting circuit, is supplied the subaudible frequency signal. Unit 21, a second balanced modulator is supplied with two inputs: one from the output of the second phase-shifting circuit 20 and the other from the output of the first phase-shifting circuit 19. Second phase-shifting circuit 20 shifts the received subaudible frequency signal by an angle $\alpha$ of approximately 90°, to provide the aforementioned phase-shifted signal which is coupled to one input of second balanced modulator 21.

Modifying means 14 further includes a two-input mixer circuit 22 having one input connected to the output of first balanced modulator 16 and the other connected to the output of second balanced modulator 21, for developing an output signal which is substantially the additive sum of the first and second modulated signals. This output signal, which contains the requisite audio frequencies as will subsequently be more fully described, is then coupled via an amplifier 23 to aural presentation means, loudspeaker 15, for providing an aural presentation of the output signal and thereby permits detection of the moving person.

Referring in detail to the operation of detection system 10, seismic transducer means 11 responds to the vibrations in the earth caused by the moving person to be detected. Seismic detector 12 of transducer means 11 is positioned in the earth so as to respond to these vibrations and generates a detection signal which is shown amplified by an amplifier 24 and supplied to filter 13 which substantially eliminates those components of the detection signal which are not in the frequency range of interest such as higher frequency components due to background noise and the like as well as amplifier noise and thereby develops the subaudible frequency signal. In the event units 24 and 13 are unnecessary and therefore omitted, seismic detector 12 will itself comprise seismic transducer means 11.

As an alternate mode of operation, acoustic transducer means 11a of FIG. 1a, shown to include microphone 12a, amplifier 24a and filter 13a and which responds to vibrations in the air caused by objects to be detected, may be substituted for seismic transducer means 11. Other suitable configurations may be used provided the circuitry is appropriately responsive to the vibrations caused by the object to be detected.

Remote operation is also possible. For example, seismic transducer means 11 or acoustic transducer means 11a (or portions thereof) may be positioned at a location remote from the remainder of the circuitry of detection system 10, in which event conventional transmitting circuitry (not shown) may modulate and transmit the detected or subaudible frequency signal, as the case may be, to a base station where the transmitted signal is received and demodulated by convention receiving circuitry (not shown) and supplied to the remainder of the system 10 units.

The subaudible frequency signal provided at the output of transducer means 11, usually of the order of 1 to 100 Hz., is modulated by balanced modulator 16 with the audio frequency sinusoidal reference signal generated by signal generator 17 to develop a first modulated signal in which the sinusoidal reference signal (carrier) is substantially suppressed. This first modulated signal, provided at the output of first balanced modulator 16, includes a first set of audio frequencies (upper sidebands) corresponding to the sum of the subaudible frequency signal components and the first reference signal frequency, and a second audio frequency set (lower sidebands) corresponding to the difference therebetween. Although use of balanced modulator 16 permits suppression of the reference signal, the remaining two sets of audio frequencies cannot satisfactorily be separated from each other by a filter since these frequency sets (i.e.: upper and lower sidebands) are only 2 to 200 cycles apart, depending on the particular frequency components in the subaudible frequency signal. A technique for satisfactorily suppressing either one of said frequency sets to provide the desired audio frequency signal having a single set of audio frequency components in which each component in the subaudible frequency signal is represented by a single audio frequency component in the set, will now be described.

The subaudible frequency signal supplied to first balanced modulator 16 is also supplied to second phase-shifting circuit 20. Circuit 20 shifts the subaudible frequency signal in phase by an angle $\alpha$ of approximately 90°, although the signal may be shifted in phase by other angles, as appropriate. For example, second phase shifting circuit 20 may provide a phase shift of 90° plus a prescribed angle $\phi$ and an additional phase-shifting circuit (not shown) may then be included in series between filter 13 and first balanced modulator 16 for shifting the subaudible frequency signal supplied to the input of modulator 16 by the aforementioned phase angle $\phi$.

For purposes of explanation, the subaudible frequency signal, designated $f(13)$, provided at the output of filter 13 is assumed to be a cosine wave of a single frequency and signal generator 17 to generate a cosine wave, $f(17)$, a first reference signal having a single frequency;

$$f(13) \doteq \cosin \omega 1 t; \text{ and} \quad (1)$$
$$f(17) \doteq \cosin \omega 2 t. \quad (2)$$

The signal provided at the output of first balanced modulator 16, $f(16)$, is represented by:

$$f(16) \doteq \tfrac{1}{2} [\cosin (\omega 2 - \omega 1) t + \cosin (\omega 2 + \omega 1) t] \quad (3)$$

The subaudible frequency signal however, will usually comprise a plurality of frequency components and thus include a like number of cosine $\omega 1t$ terms, each representing a different frequency (i.e. $\omega 1_a$, $\omega 1_b$, and the like). In such instances, $f(16)$ will include corresponding $(\omega 2 - \omega 1_a)$, $(\omega 2 - \omega 1_b)$ terms and also include corresponding $(\omega 2 + \omega 1_a)$, $(\omega 2 + \omega 1_b)$ terms. The additive (+) terms represent a first set of audio frequency components corresponding to the sum of the subaudible frequency signal components and a first reference signal frequency and the subtractive terms (−), represent a second set of audio frequency components corresponding to the difference therebetween. Both sets will be substantially in the audio frequency band since the frequency of $f(17)$ is substantially greater than that of the frequency components of the subaudible frequency signal.

Similarly, noting the trigonometric identity that $\sin \omega t = \cosin (\omega t - 90°)$, the signal provided at the output of second balanced modulator 18, designated $f(18)$, may be represented by:

$$f(18) \doteq \tfrac{1}{2} [\cosin (\omega 2 - \omega 1) t - \cosin (\omega 2 + \omega 1) t] \quad (4)$$

Here too $\omega 1$ will usually comprise $\omega 1_a$, $\omega 1_b$, and the like so that $f(18)$ represents a second modulated signal which has a first set of audio frequency components [the $(\omega 2 + \omega 1)$ terms] corresponding to the sum of the subaudible frequency signal components and the second reference signal frequency and a second set [the $(\omega 2 - \omega 1)$ terms] corresponding to the difference therebetween. It can be seen from the foregoing equations 3 and 4 that the first set of audio frequency components in the second modulated signal is substantially equal in amplitude and phase to the first set of audio frequency components in the first modulated signal. Also, the second frequency set in the second modulated signal is substantially equal in amplitude to the second frequency set in the first modulated signal but differs in phase therefrom by a prescribed angle $\beta$. This phase difference, shown as substantially 180°, is represented by the "minus sign" (−) preceding the cosin $(\omega 2 + \omega 1) t$ term.

The first and second modulated signals, $f(16)$ and $f(18)$, are supplied to mixer circuit 22 which develops as an output signal the additive sum of the first and second modulated signals. This output signal, designated $f(22)$, may be represented as:

$$f(22) \doteq \cosin (\omega 2 - \omega 1) t \quad (5)$$

or, if $\omega 1$ actually represents $n$ frequency components of the subaudible frequency signal $$f(22) \doteq \cosin (\omega 2 - \omega 1_a) t + \cosin (\omega 2 - \omega 1_b) t \ldots + \cosin (\omega 2 - \omega 1_n) t, \quad (5a)$$

which is substantially the sum of the first sets of audio frequency components of $f(16)$ and $f(18)$.

As shown by equations 5 and 5a, the second audio frequency component sets have substantially cancelled one another. Each frequency component in the subaudible frequency signal is thus represented by a corresponding single audio frequency component in the set of output signal frequency components. In an alternative mode of operation, a subtractive mixer circuit could provide the subtractive sum of the first and second modulated signals. This would result in substantially cancelling the first set of audio frequency components to provide an output signal comprising the additive sum of the second sets of audio frequency components. In both instances, an output signal is provided having a single set of audio frequency components representative of the subaudible frequency vibrations.

The output signal is then coupled via amplifier 23 to sound reproducing means, loudspeaker 15, so that the audio frequency components representative of the subaudible frequency vibrations are aurally distinguishable. The audio frequency components and their repetitive patterns corresponding to the subaudible frequency vibrations caused by the object to be detected, such as the moving person shown in the drawings, are distinctive. They are therefore recognizable by the appropriately trained person who aurally distinguishes these components on the basis of frequency and detects the presence of the object.

Figure 2:
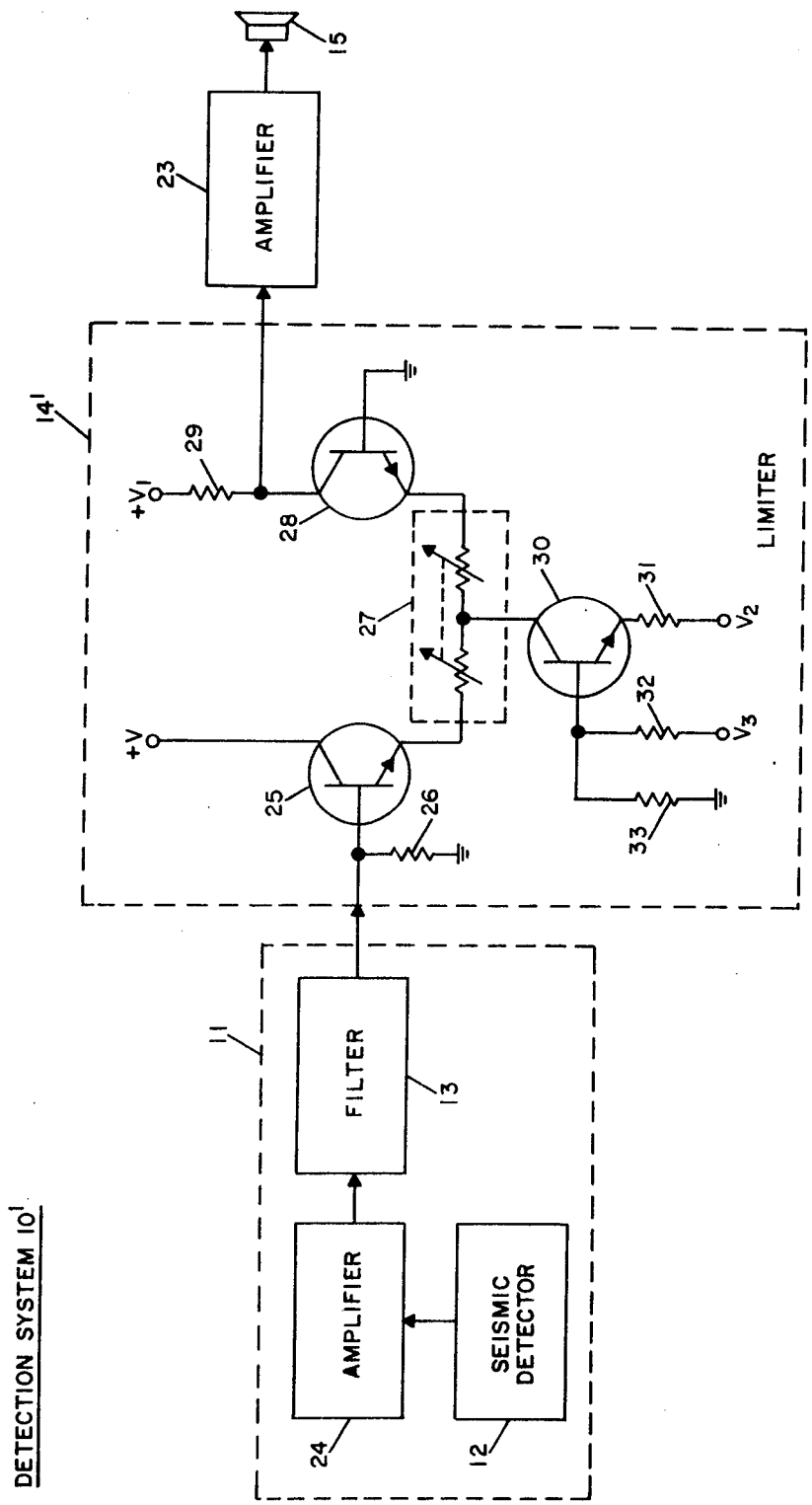
FIG. 2 is a block diagram of another form of detection system in accordance with the invention.

Description and Operation of the System of FIG. 2

Depicted in FIG. 2 is a detection system 10' in accordance with the invention and which operates in a manner analogous to the previously described detection system 10 of FIG. 1. The detection system 10' of FIG. 2 is shown to include seismic transducer means 11 and aural presentation means, loudspeaker 15, as in detection system 10. Also included is modifying means, shown as limiter circuit 14' coupled between units 11 and 23, for developing an output signal having audio frequencies representative of the subaudible frequency vibration.

As described with reference to system 10 of FIG. 1, the acoustic transducer means 11a of FIG. 1a may be utilized in lieu of the seismic transducer means 11.

Referring particularly to limiter circuit 14', this unit is shown to include a first transistor 25 having a base bias resistor 26 coupled to a reference potential shown as ground and whose collector is connected to a reference potential shown as voltage V. The emitter of transistor 25 is coupled via a dual ganged potentiometer 27 to the emitter of a second transistor 28 whose base is connected to a second reference potential and whose collector is coupled via a collector resistor 29 to a reference voltage $V_1$. The junction of the dual potentiometer 27 connected to the collector of a third transistor 30 whose emitter is coupled via an emitter resistor 31 to a reference potential $V_2$. A first base resistor 32 is connected between the base of the transistor 30 and a reference potential $V_3$ and a second base resistor 33 is connected between the base of transistor 29 and a ground reference potential.

With regard to the operation of modifying means 14', the limiter circuit modifies the amplitude of the subaudible frequency signal supplied to its input, the base of transistor 25, to develop an output signal at the collector of transistor 28. This output signal includes the fundamental frequency components of the subaudible frequency signal together with harmonics, including ones in the audio frequencies, of said signal. These harmonics are representative of the subaudible frequency vibrations caused by the object and those in the audio frequencies are the ones of particular interest.

To provide the requisite harmonics, circuit 14' clips the positive and negative tops or peaks of the received input signal, which is as described with reference to system 10 and a sinusoidal type, to create a square wave-like output signal. The desired degree of clipping is obtained by a suitable adjustment of dual ganged potentiometer 27. The limiter circuit 14' therefore provides an audio frequency output signal in which the audio frequency components of the signal comprise harmonics which are representative of the subaudible frequency vibrations. Components or harmonics caused by particular objects such as a moving person are distinctive and aurally distinguishable thereby permitting detection of the objects, for example, by a person listening to the output from loudspeaker 15.

While applicant does not wish to be limited to any particular set of circuit constants, the following have proved useful in the limiter circuit 14' of FIG. 2.

| | |
|---|---|
| Transistor 25, 28, 30 | 2N5089 |
| Resistor 26 | 3900 ohms |
| Resistor 29 | 3000 ohms |
| Resistor 31 | 3900 ohms |
| Resistor 32 | 10,000 ohms |
| Resistor 33 | 5,600 ohms |
| Dual ganged potentiometer 27 | 100 ohms (each potentiometer) |

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A detection system responsive to subaudible frequency vibrations, comprising:
    transducer means responsive to subaudible frequency vibrations for developing a subaudible frequency signal corresponding to said vibrations;
    first modulator means responsive to the subaudible frequency signal and to a supplied first reference signal for developing a first modulated signal having a first set of frequency components corresponding to the sum of the subaudible frequency signal and said first reference signal frequency and a second set corresponding to the difference therebetween;
    second modulator means responsive to the subaudible frequency signal and to a supplied second reference signal for developing a second modulated signal having a first set of frequencies corresponding to the sum of the subaudible frequency signal and said second reference signal frequency and a second set corresponding to the difference therebetween;
    mixer means responsive to said first and second modulated signals for providing an output signal having a single set of audio frequency components each frequency component in the subaudible frequency signal being represented by a single audio frequency component in said set;
    and means responsive to the output signal for providing an aural presentation of said output signal wherein the audio frequency components therein representative of the subaudible frequency vibrations caused by an object are aurally distinguishable for permitting detection of said object.

2. A detection system as described in claim 1, wherein the first and second reference signals are both of substantially the same audio frequency but differ in phase from each other by a prescribed angle $\phi$.

3. A detection system as described in claim 2, wherein the first and second reference signals differ in phase from each other by approximately 90°;
    said first modulating means is a first balanced modulator;
    said second modulating means includes phase shifter means for shifting the phase of said subaudible frequency signal by an angle $\alpha$ and further includes a second balanced modulator responsive to the phase shifted subaudible frequency signal and to the second reference signal for providing said second modulated signal, the first component set being substantially equal in amplitude to the first component set in the first modulated signal but differs in phase therefrom by a prescribed angle $\beta$, and the second component set being substantially equal in amplitude and phase to the second component set in said first modulated signal;
    and wherein said mixing means provides the additive sum of the first and second modulated signals.

4. A detection system responsive to subaudible frequency vibrations, comprising:
    transducer means responsive to subaudible frequency vibrations for developing a subaudible frequency signal corresponding to said vibrations;
    a first balanced modulator responsive to the subaudible frequency signal and to a first audio frequency reference signal for developing a first modulated signal having a first set of audio frequency components corresponding to the sum of the subaudible frequency signal and the first reference signal frequency and a second set corresponding to the difference thereof;
    phase shifter means for shifting the phase of the subaudible frequency signal by a phase angle of approximately 90°;
    a second balanced modulator responsive to the phase-shifted subaudible frequency signal and to a second supplied audio frequency reference signal corresponding to said first reference signal shifted in phase by an angle of approximately 90° for developing a second modulated signal having a first set and a second set of audio frequency components, the first set being substantially equal in amplitude to the first component set in said first modulated signal but differs in phase therefrom by approximately 180°, and the second component set being substantially equal in amplitude and phase to the second component set in said first modulated signal;

mixer means responsive to the first and second modulated signals for adding the modulated signals to develop an output signal having a single set of audio frequency components whose amplitude is substantially equal to the additive sum of the modulated signal second component sets, each frequency component in the subaudible frequency signal being represented by a corresponding single audio frequency component in the output signal set;

and sound reproduction means responsive to the output signal for providing an aural presentation of said output signal wherein audio frequency components therein representative of the subaudible frequency vibrations caused by an object are aurally distinguishable for permitting detection of said object.

5. A detection system as described in claim 4, wherein said transducer means is a seismic transducer means responsive to subaudible frequency vibrations in the earth for developing the subaudible frequency signal.

6. A detection system as described in claim 4, wherein said transducer means is an electro-acoustic transducer means responsive to subaudible frequency acoustic vibrations for developing the subaudible frequency signal.

7. A detection system responsive to subaudible frequency vibrations, comprising:

transducer means responsive to subaudible frequency vibrations for developing a subaudible frequency signal corresponding to said vibrations;

means for modifying the amplitude of the subaudible frequency signal to develop an output signal having the fundamental frequency components of said subaudible frequency signal and audio frequency harmonic components thereof, all said components being representative of the subaudible frequency vibrations;

and means responsive to the output signal for providing an aural presentation of said output signal wherein audio frequency harmonic components therein representative of the subaudible frequency vibrations caused by an object are aurally distinguishable for permitting detection of said object.

8. A detection system as described in claim 7, wherein said modifying means is a limiter circuit for clipping the upper and lower amplitude peaks of the subaudible frequency signal to provide a square wave-like output signal which includes the fundamental frequency components of said subaudible frequency signal together with audio frequency harmonic components thereof.

9. A detection system as described in claim 7, wherein said transducer means is a seismic transducer means responsive to subaudible frequency vibrations in the earth for developing the subaudible frequency signal.

10. A detection system as described in claim 7, wherein said transducer means is an electro-acoustic transducer means responsive to subaudible frequency acoustic vibrations for developing the subaudible frequency signal.

* * * * *